United States Patent [19]
Bosack

[11] Patent Number: 5,088,032
[45] Date of Patent: Feb. 11, 1992

[54] METHOD AND APPARATUS FOR ROUTING COMMUNICATIONS AMONG COMPUTER NETWORKS

[75] Inventor: Leonard Bosack, Atherton, Calif.

[73] Assignee: Cisco Systems, Inc., Menlo Park, Calif.

[21] Appl. No.: 149,820

[22] Filed: Jan. 29, 1988

[51] Int. Cl.$^5$ .................... H04Q 11/04; H04J 3/26
[52] U.S. Cl. .................... 395/200; 370/94.1; 364/284; 364/284.3; 364/284.4; 364/242.94; 364/229; 364/229.3; 364/229.4; 364/229.5; 364/DIG. 1
[58] Field of Search ... 364/200 MS File, 900 MS File; 370/94, 94.1, 94.3, 60.1

[56] References Cited
U.S. PATENT DOCUMENTS

| | | | |
|---|---|---|---|
| 4,314,367 | 2/1982 | Bakka et al. | 370/60 |
| 4,532,625 | 7/1985 | Stover | 370/58 |
| 4,709,365 | 11/1987 | Beale et al. | 371/11 |
| 4,736,363 | 4/1988 | Aubin et al. | 370/60 |
| 4,748,658 | 5/1988 | Gopal et al. | 379/221 |
| 4,825,206 | 4/1989 | Brice, Jr. et al. | 340/825.02 |
| 4,833,468 | 5/1989 | Larson et al. | 340/825.8 |
| 4,862,496 | 8/1989 | Kelly et al. | 379/221 |
| 4,905,233 | 2/1990 | Cain et al. | 370/94.1 |
| 4,939,726 | 7/1990 | Flammer et al. | 370/94.1 |

Primary Examiner—Gareth D. Shaw
Assistant Examiner—Kevin A. Kriess
Attorney, Agent, or Firm—Lyon & Lyon

[57] ABSTRACT

An improved method and apparatus for routing data transmissions among computer networks. The computer networks are interconnected with a series of gateway circuits. Each gateway identifies all destination computers to which it is connected and identifies the path or paths to each destination computer. For each identified path, the gateway stores the topological delay time for a transmission, the path bandwidth for the narrowest bandwidth segment of a path and a number corresponding to the reliability of the path. When a transmission is received, the gateway examines the various paths in accordance with a predetermined algorithm which also considers the channel occupancy of each path to determine a best path for transmision. The data transmission is then directed over the best path. If more than one path exists, the data may be directed in multiplex fashion over two or more paths with the amount of data on each path being related to the quality of the path. The routing information to destination networks is broadcast periodically by each gateway circuit to its neighboring gateway circuits.

64 Claims, 11 Drawing Sheets

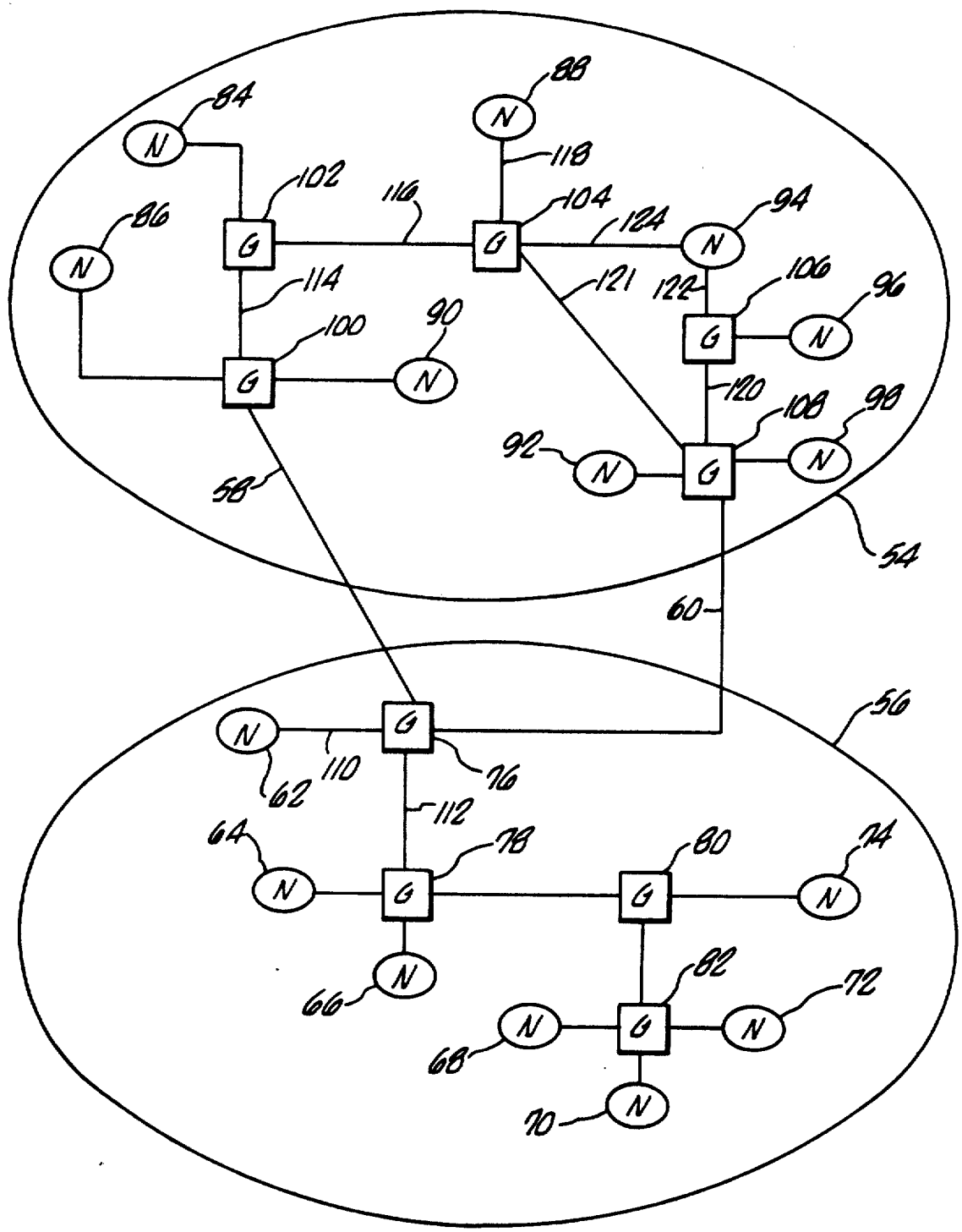
FIG_2.

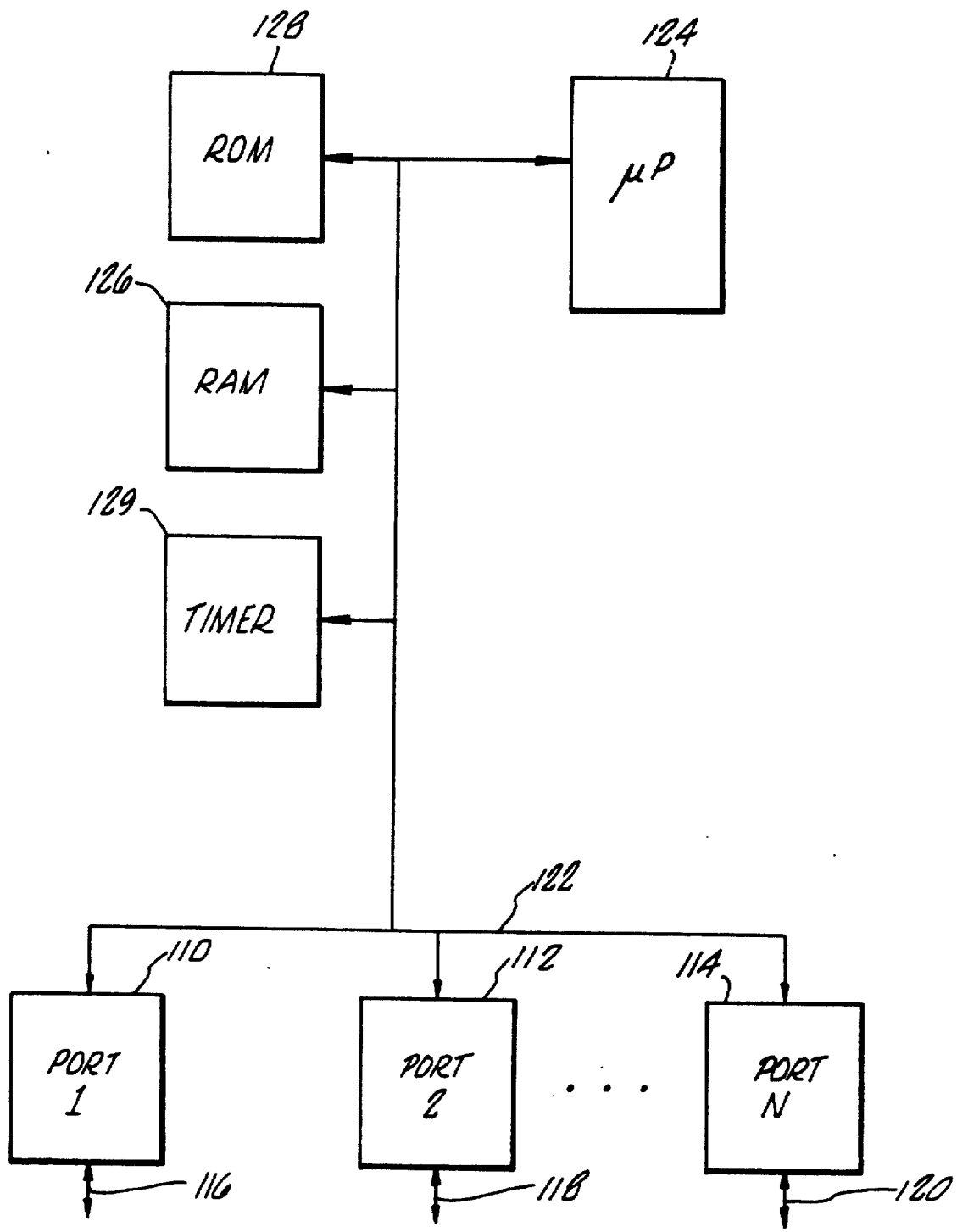
FIG_3.

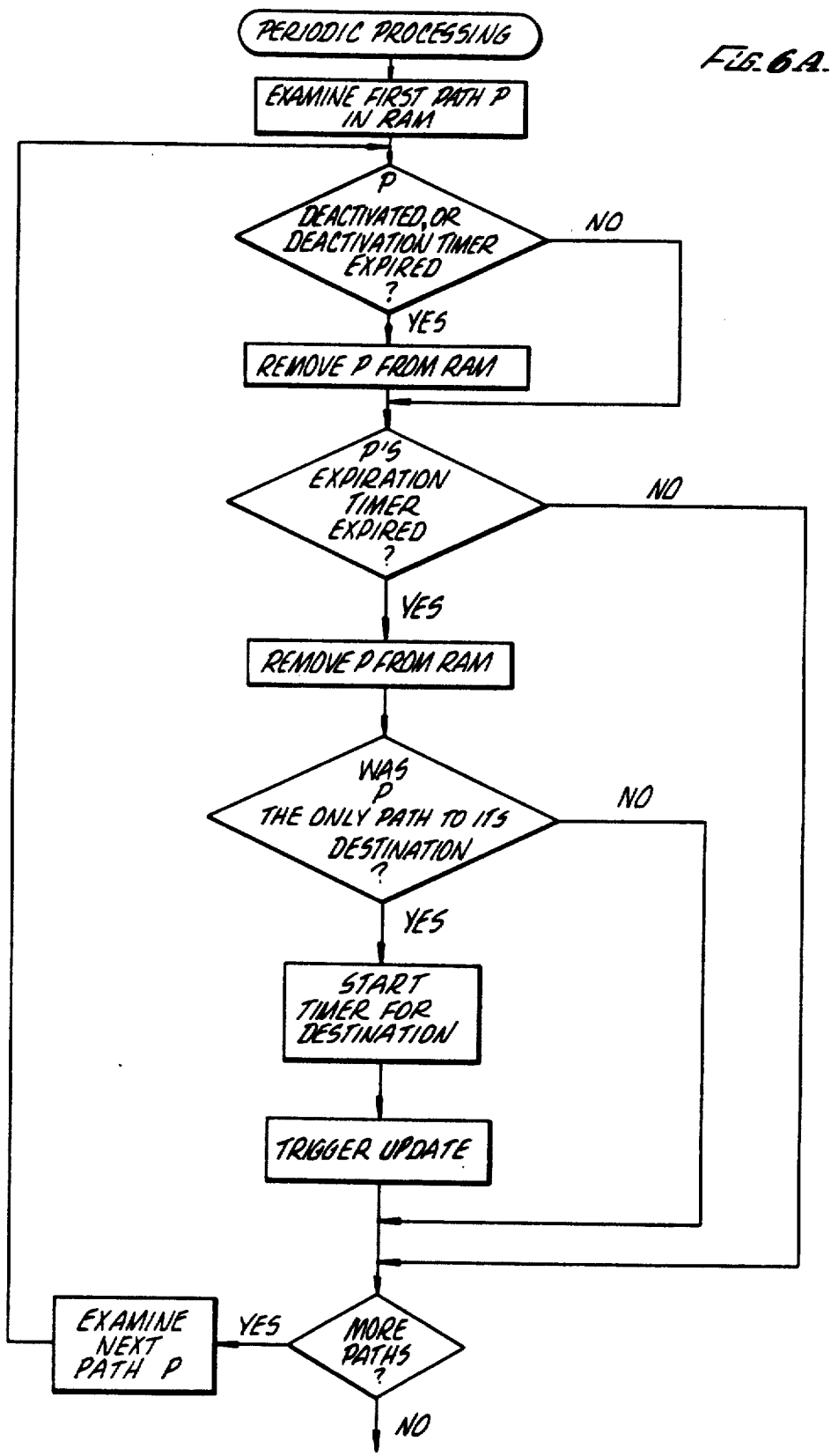

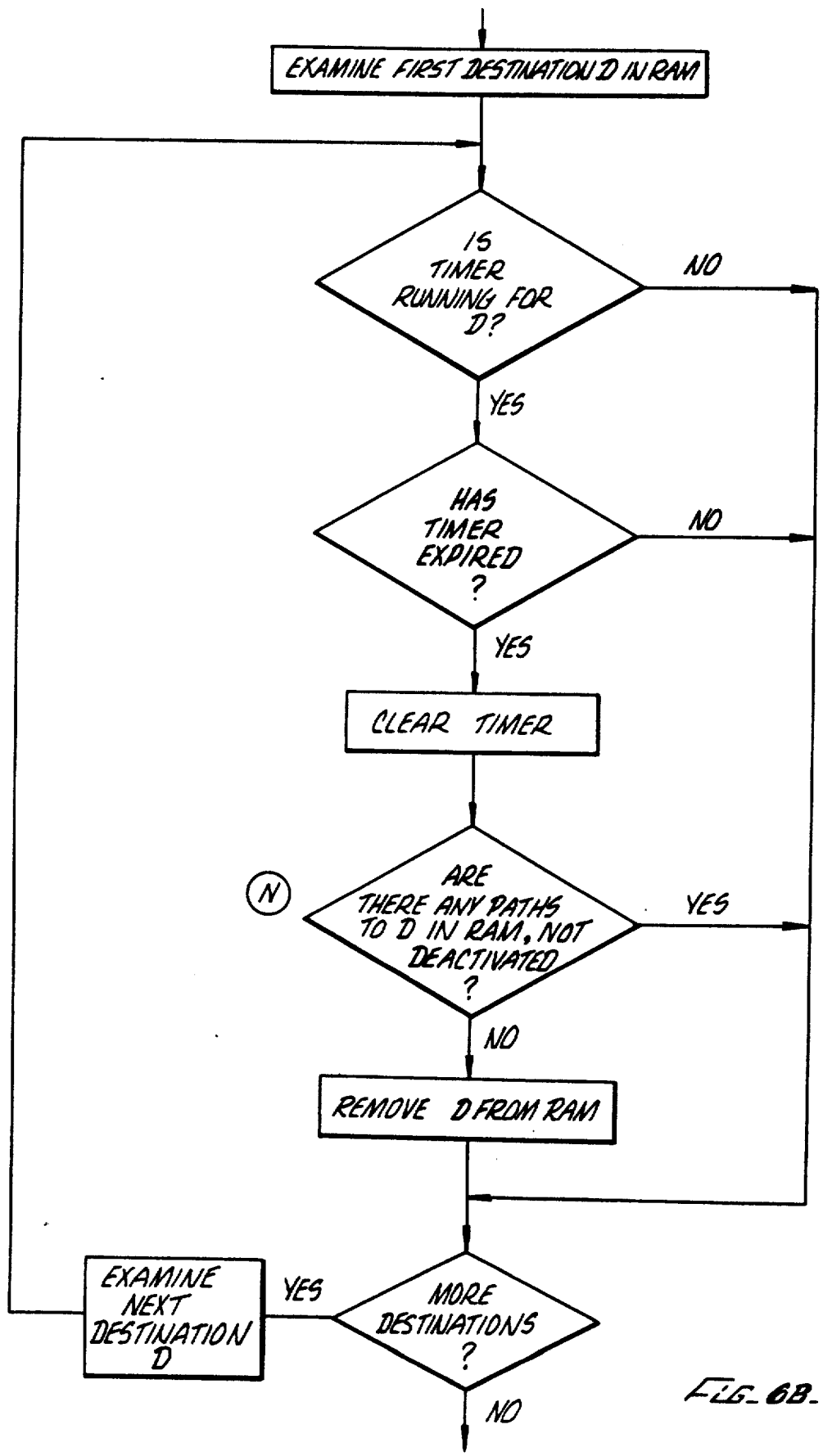
FIG_6B.

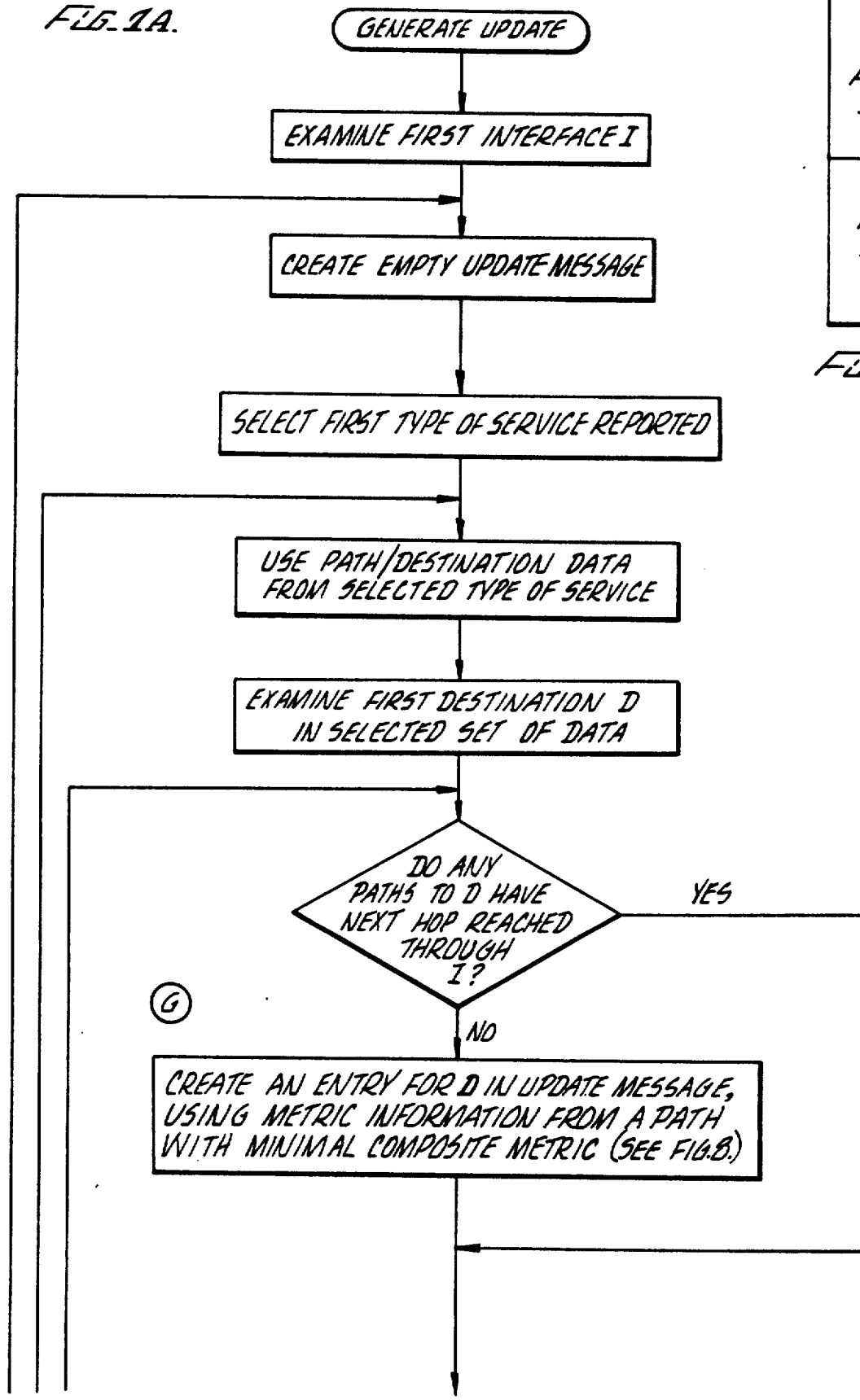

METHOD AND APPARATUS FOR ROUTING COMMUNICATIONS AMONG COMPUTER NETWORKS

The Appendix contains the details of the metric computations for the data paths.

BACKGROUND

The present invention relates to circuits for interconnecting computer networks.

Computer networks consist of a number of computer systems coupled together with a bus, rings or other medium, so that they can communicate with each other. Examples of such a system are the Xerox ETHERNET System and the IBM Token Ring Systems. Oftentimes, it is desirable to connect two such networks together. FIG. 1A shows such a configuration in which a number of hosts 12 are connected together with a bus 14 in a network A and a number of hosts 16 are connected together with a bus 18 in a network B. Buses 14 and 18 are coupled together to interconnect the networks with a repeater 20.

When more than two networks are coupled together, it is often desirable to replace the repeater with a circuit which can route a communication packet from a host computer in one network to a computer in another network. These circuits are often called bridge circuits. A system interconnected using bridge circuits is shown in FIG. 1B. A number of bridge circuits 22-30 interconnect a number of networks 32-42. Networks 32-42 each consist of a bus or other medium, and several attached hosts, similar to networks A and B, in FIG. 1A. Links 53 and 55 are shown as simple links. However, they could be full networks, with hosts connected to them.

These bridge circuits receive a data packet from one network and send it out an appropriate port of the bridge circuit so that it will be directed to the appropriate destination network. For instance, a data packet from a computer in network 36 could be transmitted to bridge 24. Bridge 24 would then determine that network 38 is the destination. Accordingly, the packet would be sent out a port 44 of bridge 24 and not a port 48. Bridge 22 would receive the packet and ignore it while bridge 26 would receive the packet and direct it out its port 50. A problem arises if there were to be a connection such as that shown in phantom as line 52, which would cause a loop. In this instance, bridge 24 could send the data packet out port 48 and route it through network 42, bridge 30 and bridge 28 to bridge 26 in the example just given. To avoid such loops, data path 52 will be ignored by bridges 28 and 30 if it is so connected. An example of such a bridge circuit is described in U.S. Pat. No. 4,597,078 to Kempf.

If there are multiple paths to a destination network, the prior art required bridge circuits to disable links until no loops remained in the system.

SUMMARY OF THE INVENTION

The present invention is an improved method and apparatus for routing data transmissions between computer networks. The computer networks are interconnected with a series of gateway circuits. Each gateway identifies all destinations for which it has a directly connected interface. Paths to other destinations are obtained through an interchange of routing transmissions with adjacent gateways. For each identified path, the gateway stores the identity of the gateway circuit which is the "next hop" on the path, and a vector of metric information describing the path. The metric information includes the topological delay time for a transmission, the path bandwidth for the narrowest bandwidth segment of the path, the channel occupancy of the path, and a count of the number of gateway circuits through which the path runs (the "hop count"). Based on this metric information, a single "composite metric" is calculated for the path. When a data transmission is received, the gateway examines the various paths in accordance with a predetermined algorithm which uses the composite metric to determine a best path for transmission. The data transmission is then directed over that best path. If more than one path exists, the data may be directed in multiplex fashion over two or more paths with the amount of data on each path being related to the quality of the path.

The routing information to all destinations is broadcast periodically by each gateway circuit to its neighboring gateway circuits. The list of paths received by each gateway is compared to its existing list. Any new destination and paths are added to the gateway's internal list. Information in the broadcast is also used to update channel occupancy and other information about existing paths. Similarly, paths with non-respondent circuits are deleted from the internal list, providing dynamic data to construct the topological map of the networks. This procedure is in accordance with the Ford algorithm for identifying interconnections. The Ford algorithm is modified in three critical aspects to generate a method which will work effectively in practice. First, instead of a simple metric, a vector of metrics is used to characterize paths. Second, instead of picking a single path with the smallest metric, traffic is split among several paths, whose metrics fall into a specified range. Third, several features are introduced to provide stability in situations where the topology is changing.

The determination of the best path is done in one embodiment by computing a metric composite according to the formula $[(K_1/B_e)+(K_2 D_c)]r$ where:

$K_1, K_2$ = constants;
$B_e$ = path bandwidth x(1 − channel occupancy);
$D_c$ = topological delay; and
r = reliability.

The path having the smallest composite metric number will be the best path. Where there are multiple data paths to the same destination, the gateway can route the data transmission packets over more than one path through multiplexing. This is done in accordance with the composite metric for each data path. For instance, if one data path has a composite metric of 1 and another data path has a composite metric of 3, three times as many packets will be sent over the data path having the composite metric of 1. However, only paths whose composite metrics are within a certain range of the smallest composite metric will be used.

The present invention provides a system for interconnecting computer networks which can handle a general graph topology including loops in a stable manner. The system maintains full path metric information, i.e., it knows the path parameters to all other networks to which each gateway is coupled. Traffic can be distributed over parallel paths and multiple path parameters can be simultaneously computed over the entire network. This information is routinely and dynamically updated for each gateway circuit.

For a fuller understanding of the nature and advantages of the invention, reference should be made to the ensuing detailed description taken in conjunction with the accompanying drawings.

BRIEF DESCRIPTION OF THE DRAWINGS

FIG. 2 is a diagram of a plurality of computer networks interconnected using gateways according to the present invention;

FIG. 3 is a block diagram of a gateway according to the present invention;

FIG. 7 shows how FIG. 7A and FIG. 7B forms a flowchart of the subroutine for generating a routing update packet for broadcast.

DETAILED DESCRIPTION OF THE PREFERRED EMBODIMENTS

Figure 1A:
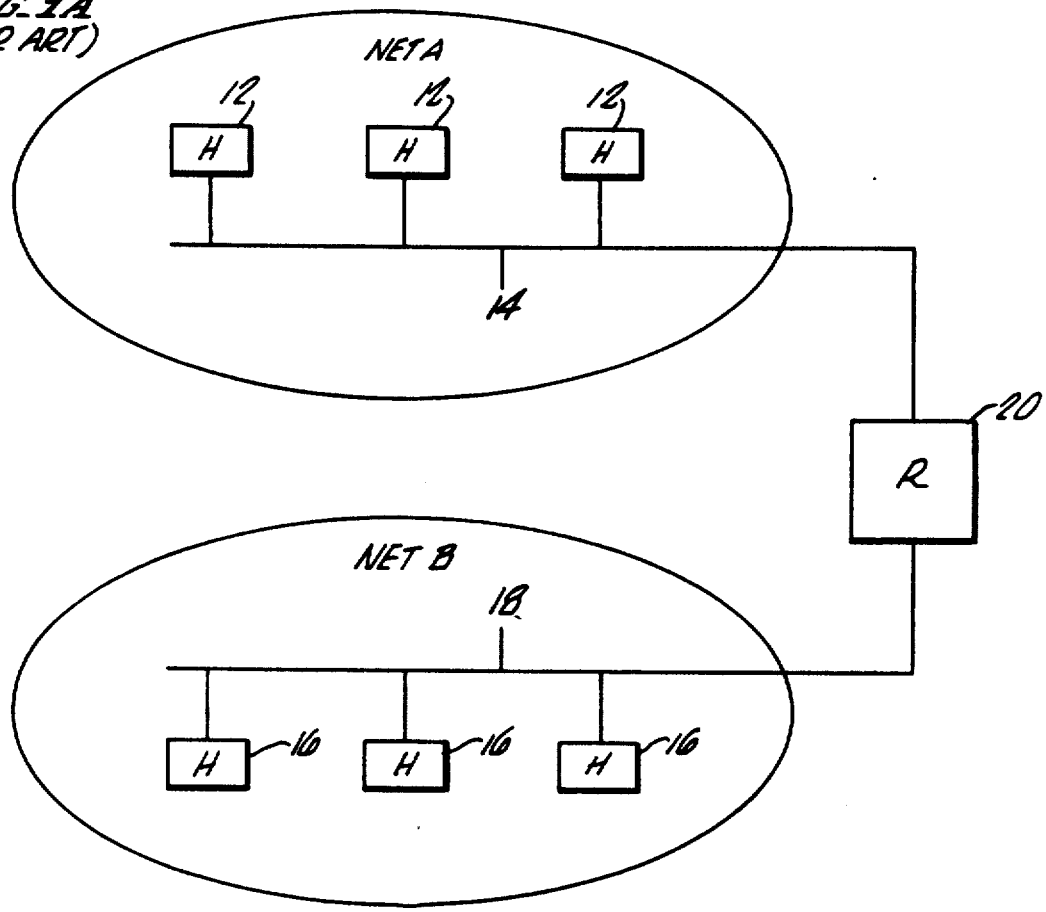
FIG. 1A is a diagram of a prior art repeater coupling together two computer networks.
Figure 1B:
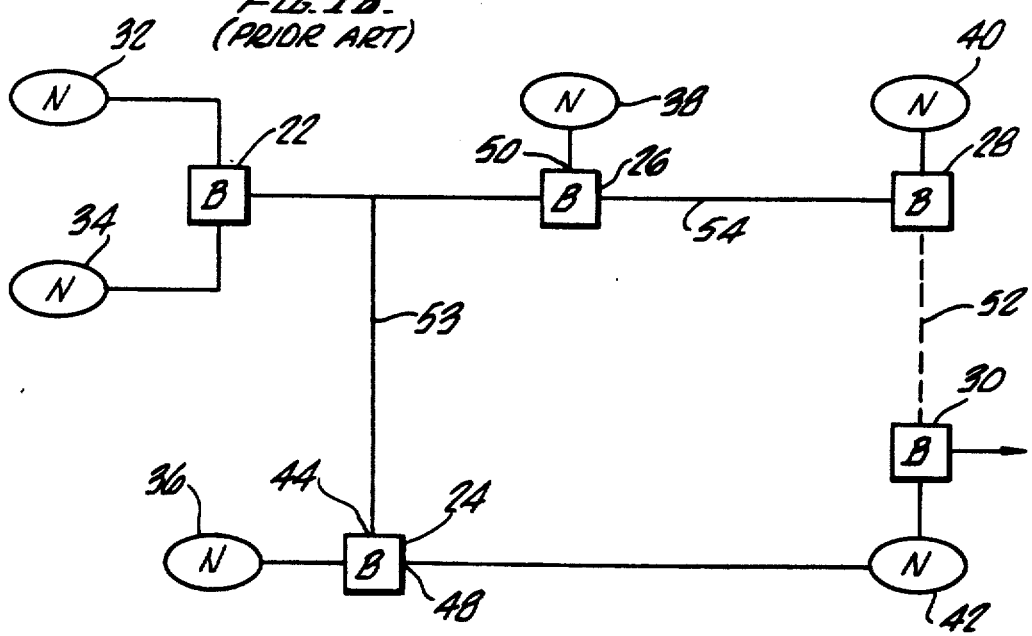
FIG. 1B is a diagram of a prior art system using bridge circuits to interconnect computer networks.

FIG. 2 shows a pair of computer network systems 54 and 56 interconnected by two links 58 and 60. Network systems 54 and 56 may be in different states, for example, and links 58 and 60 might be a land microwave repeater link and a satellite link, respectively. Network system 56 is composed of computer networks 62-74 interconnected by gateway circuits 76-82. Computer network system 54 consists of computer networks 84-98 interconnected by gateway circuits 100-108.

In this figure and the following figures, networks shown as "N" include a bus, ring, or other communications medium, and any attached computers. Lines shown connecting bridges or gateways may be point-to-point connections, or they may be networks with additional computers attached.

A block diagram of a typical gateway circuit according to the present invention is shown in FIG. 3. A plurality of ports 110, 112 and 114 are shown, with any other number of ports being possible. These ports are connected to external data communication media 116, 118 and 120, respectively. The ports are also coupled to an internal data bus 122. Also connected to internal data bus 122 is a microprocessor 124, a random access memory (RAM) 126, a read only memory (ROM) 128, and a timer 129.

Basically, when a data packet is received through one of the ports, it is stored in RAM 126, examined by microprocessor 124, and then transmitted out an appropriate port to send it along the best path to the destination computer. The timer is used to trigger certain changes in the routing data base, as will be described in connection with FIG. 6. In a typical embodiment, a gateway might have three ports coupled to ETHERNETS and six serial ports.

When a gateway is coupled into a system, it is first initialized. This may be done by an operator at a computer in the network coupled to the gateway, by using information retained in a non-volatile portion of RAM, or by reading remote information from configuration files into a gateway. A description of each datalink coupled to a port of the gateway is provided, including (a) the topological delay along the link (i.e., how long it takes a single bit to transverse the link), (b) the bandwidth of the link, and (c) the reliability of the link (expressed as a probability that a packet sent on the link will arrive undamaged at the next hop).

For instance, in FIG. 2, gateway 76 would be told that a first port is coupled on a link 110 to a network 62, a second port is coupled on a link 112 to a gateway 78, a third link is link 60 and a fourth link is link 58.

Thus, initially, gateway 76 only knows that it can reach any destination computer in network 62, and that it is attached to links 58, 60 and 112. All the gateways are programmed to periodically transmit to their neighboring gateways the information which they have been initialized with, as well as information gathered from other gateways. Thus, gateway 76 would receive transmissions from gateways 100 and 108 and learn that it can reach computers in networks 86 and 90 through gateway 100 and computers in networks 92 and 98 through gateway 108. This information will propagate. For example, gateways 100 and 108 will learn the destination computers coupled to gateways 102 and 106 and will transmit these to gateway 76 on the next periodic transmission. This process is repeated until each gateway learns all the destination computers it can reach.

Each gateway computes a metric composite to determine the desirability of the data paths to destination computers. For instance, for a destination network 88, gateway 76 would compute metric functions for two paths. The first path would be along link 58 through gateway 100. The second data path would be along link 60 through gateway 108. Note that paths are defined simply by the next hop. There are actually three possible routes for a transmission, involving links 114, 121, and 122. However, the routes involving links 121 and 122 both go through gateway 108. Gateway 76 thus need not choose between them, leaving the choice to gateway 108.

The composite metric function computed for each data path is as follows:

$$[(K_1/B_e)+(K_2D_c)]r \qquad \text{Eq. 1}$$

where:
  $r$ = fractional reliability (% of transmissions that are successfully received at the next hop);
  $D_c$ = composite delay;
  $B_e$ = effective bandwidth (unloaded bandwidth $\times(1-$channel occupancy); and
  $K_1$, $K_2$ = constants.

The composite delay, $D_c$ is determined as follows:

$$D_c = D_s + D_{cir} + D_t \qquad \text{Eq. 2}$$

where:
  $D_s$ = switching delay;
  $D_{cir}$ = circuit delay (propagation delay of 1 bit); and
  $D_t$ = transmission delay (the no-load delay for a 1500 bit message).

An example of a table stored in a RAM 126 of a gateway of FIG. 3 is as follows (Note that individual components of the metric vector are not shown, for simplicity. They would be present in RAM in an actual implementation.):

TABLE 1

Destination 1
| | |
|---|---|
| Path A: | Port 1, Next hop gateway 2 comp. metric = 1.7 |
| Path B: | Port 2, Next hop gateway 3 comp. metric = 3.2 |

Destination 2
| | |
|---|---|
| Path A: | Port 3, Next hop gateway 4 comp. metric = 4.0 |

Destination 3
| | |
|---|---|
| Path A: | Port 1, Next hop gateway 2 comp. metric = 2.0 |
| Path B: | Port 2, Next hop gateway 6 comp. metric = 1.0 |
| Path C: | Port 4, Next hop gateway 7 comp. metric = 3.0 |

.
.
.

Destination N
| | |
|---|---|
| Path A: | Port 1, Next hop gateway 2 comp. metric = 5.0 |
| Path B: | Port 2, Next hop gateway 3 comp. metric = 1.0 |

This process of compiling a list of destinations and paths by each gateway transmitting its information to neighboring gateways is based on the Ford algorithm, originally developed for the solution of transportation problems. The basic premise of the algorithm is to tell neighbors and the process repeats itself until eventually each gateway knows all possible destinations.

The present invention makes the Ford algorithm work in practice in a real environment by adding three features to the Ford algorithm.

1) Instead of a simple metric, a vector of metrics is used to characterize paths. A single composite metric can be computed from this vector according to Eq. 1. Use of a vector allows the gateway circuit to accommodate different types of service, by using several different coefficients in Eq. 1. It also allows a more accurate representation of the characteristics of the network than a single metric.

2) Instead of picking a single path with the smallest metric, traffic is split among several paths with metrics falling into a specified range. This allows several routes to be used in parallel, providing a greater effective bandwidth than any single route. A variance V is specified by the network administrator. All paths with minimal composite metric M are kept. In addition, all paths whose metric is less than $V \times M$ are kept. Traffic is distributed among multiple paths in inverse proportion to the composite metrics. No traffic is sent along paths whose remote composite metric (the composite metric calculated at the next hop) is greater than the composite metric calculated at the gateway. This is because sending traffic to a gateway with a larger composite metric is like sending to someone who is farther away from the destination.

3) Several features are introduced to provide stability in situations where the topology is changing. These features are intended to prevent routing loops and "counting to infinity," which have characterized previous attempts to use Ford-type algorithms for this type of application. The primary stability features are the following:

(a) Routing broadcasts must be generated separately for each interface on a gateway. The broadcast sent out each interface must not include paths whose next hop gateway circuit is reached through that interface as the other gateways connected to that interface can reach the next hop directly.

(b) Whenever the metric information for a path is revised due to processing an incoming routing broadcast, the old and new hop counts are compared. If the new hop count is larger than the old by more than 2, that path is disabled. This is a "poison reverse", which catches spurious routes (if the hop count increases by more than 2, it is assumed that counting to infinity has started). A record of the path is retained, to prevent it from being re-established. This record is retained for a period of time equal to the maximum time for a transmission to the most distant part of the system. At the end of that time, all record of the path is deleted. After that time, it may be re-established if it appears in subsequent routing updates received from neighboring gateways.

(c) When the metric information for a path is revised due to processing an incoming routing update, all paths to the same destination are examined. The smallest composite metric from any of the paths is identified before and after the change. If this value is larger after the change than before by at least a factor of 1.3, or if there is no usable path to the destination after the change, a timer (hold-down) is started for that destination. Until the timer expires, no change in paths is accepted that would decrease the composite metric of any existing path, nor are new paths accepted. The timer lasts for a period of time equal to the maximum time for a transmission to the most distant part of the system. This timer allows a change for the worse in a path to propagate throughout the system. Otherwise, a gateway which hasn't been informed of the bad path may transmit a better route, which in reality is no longer better. The value of 1.3 was chosen to prevent small changes from causing a revision, thus resulting in continuous revisions.

The gateway circuits are designed to handle multiple "types of service" and multiple protocols. Type of service is a specification in a data packet that modifies the way paths are to be evaluated. For example, certain protocols allow the packet to specify the relative importance of high bandwidths, low delay, or high reliability. Generally, interactive applications will specify low delay, whereas bulk transfer applications will specify high bandwidth. These requirements determine the relative values of $K_1$ and $K_2$ that are appropriate for use in Eq. 1. Each combination of specifications in the packet that is to be supported is referred to as a "type of service". For each type of service, a set of parameters $K_1$ and $K_2$ must be chosen. A separate list of paths to each destination is kept in the RAM for each type of service. This is done because paths are selected and ordered according to the composite metric defined by Eq. 1. This is different for each type of service. Information from all of these lists is combined to produce the routing update messages exchanged by the gateways, as described in FIG. 7.

The set of processes described in FIGS. 4-8 are intended to handle a single network protocol. e.g. TCP/IP, DECnet, or the ISO/OSI protocol. A single gateway circuit may process data which is specific to more than one protocol. Because each protocol has different addressing structures and packet formats, the computer code used to implement FIGS. 4-8 will generally be different for each protocol. The process described in FIG. 4 will vary the most. The processes described in FIGS. 5-8 will have the same general structure. The primary difference from protocol to protocol will be the format of the routing update packet, which must be designed to be compatible with a specific protocol.

Note that the definition of a destination may vary from protocol to protocol. The method described here can be used for routing to individual hosts, to networks, or for more complex hierachical address schemes. Which type of routing is used will depend upon the addressing structure of the protocol.

FIGS. 4-7 show a flow chart for a program which will be run by microprocessor 124 of FIG. 3. At the start of the program, acceptable protocols and parameters describing each interface are entered.

The gateway will only handle certain protocols which are listed and, generally, any communication from a system using a protocol not on the list will be ignored. It is possible to construct hybrid devices that can act both as a bridge circuit of the prior art and a gateway circuit.

The data inputs are (1) the networks and gateways to which the gateway is connected, (2) the bandwidth of the links to these networks and gateways, (3) the reliability of each of these links, and (4) the topological delay along each link. The metric function for each data path is then computed according to Eq. 1. In addition, a value for the variance V is entered.

Once this initial information is entered, operations in the gateway are triggered by events: either the arrival of a data packet at one of interfaces 110-114, or the expiration of timer 129. The processes described in FIGS. 4-7 are triggered as follows.

Figure 4:
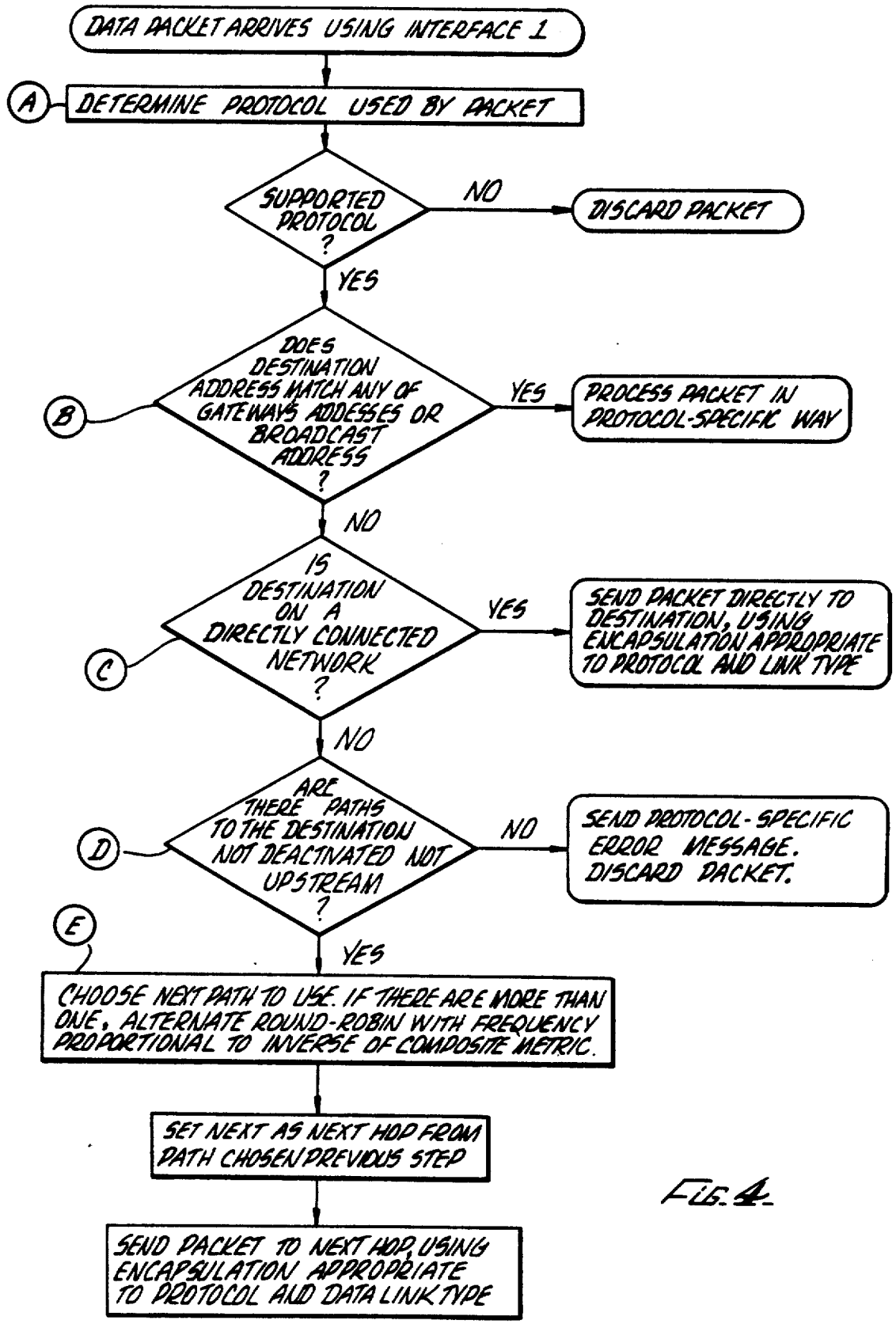
FIG. 4 is a flowchart of the program executed by the gateway of FIG. 3 for routing data packets.

When a packet arrives, it is processed according to FIG. 4. This results in the packet being sent out another interface, discarded, or accepted for further processing.

When a packet is accepted by the gateway for further processing (e.g., when it is addressed to the gateway), it is analyzed in a protocol-specific fashion not described in this specification. If the packet is a routing update, it is processed according to FIG. 5. Otherwise, the packet relates to a function which is not a part of this invention.

Figure 6C:
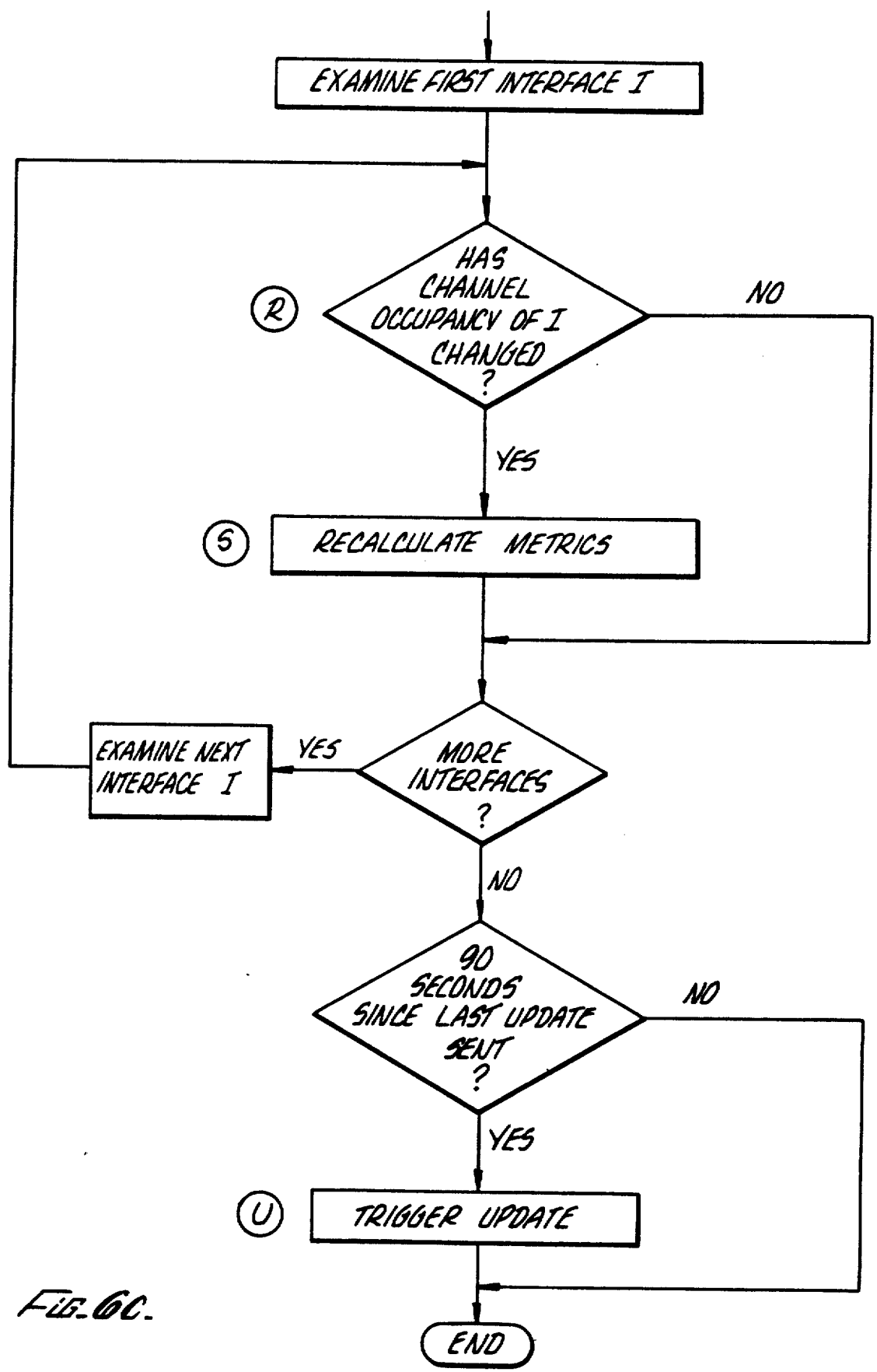
FIG. 6 shows how FIG. 6A, FIG. 6B and FIG. 6C form a flowchart of the subroutine for periodic updating of path information.
Figure 11:
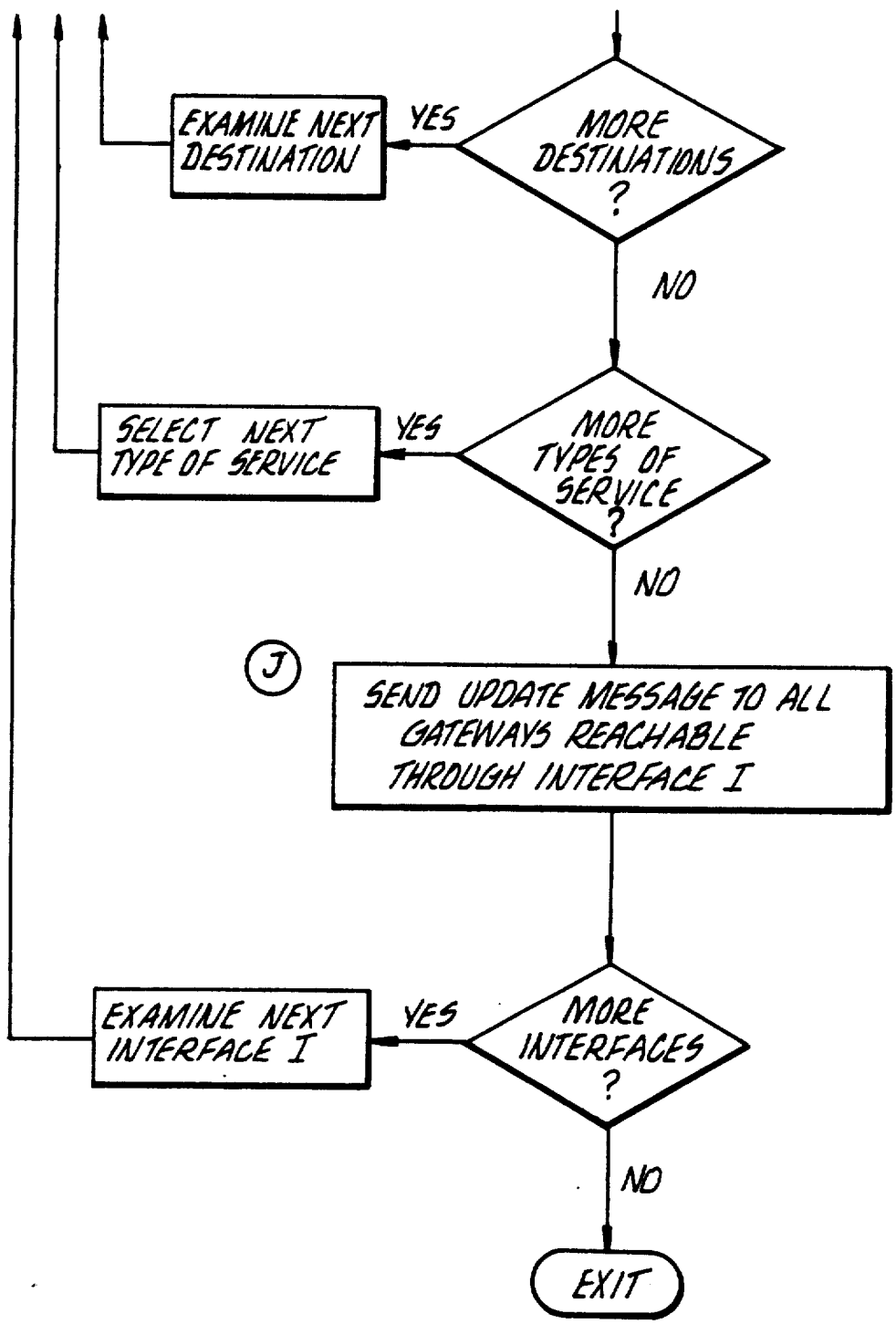

FIG. 6 shows events triggered by timer 129. The timer is set to generate an interrupt once per second. When the interrupt occurs, the process shown in FIG. 6 is executed.

FIG. 7 shows a routing update subroutine. Calls to this subroutine are shown in FIGS. 5 and 6.

Figure 5A:
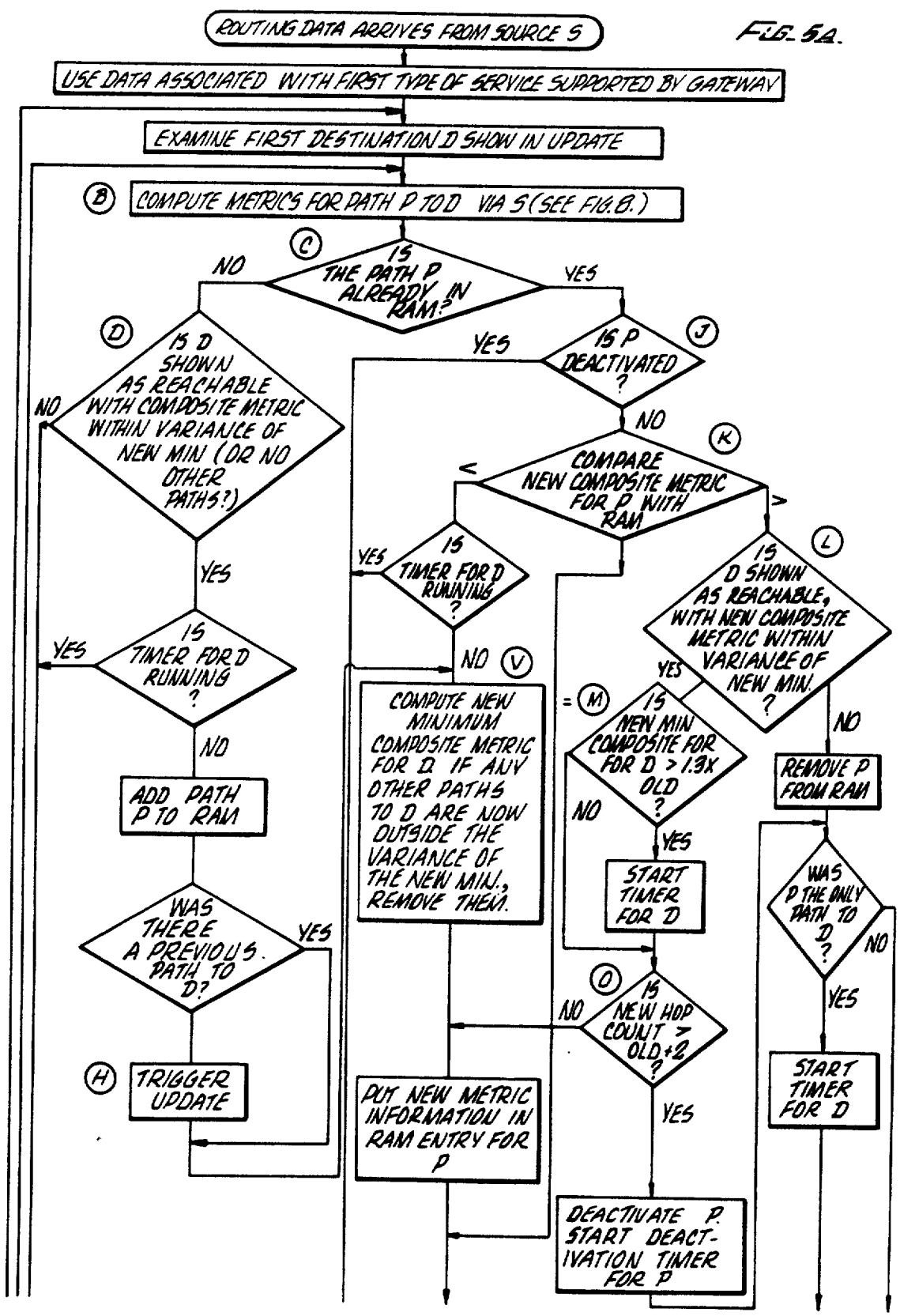
FIG. 5 shows how FIG. 5A and FIG. 5B form a flowchart of the subroutine for processing a received routing update packet.
Figure 5B:
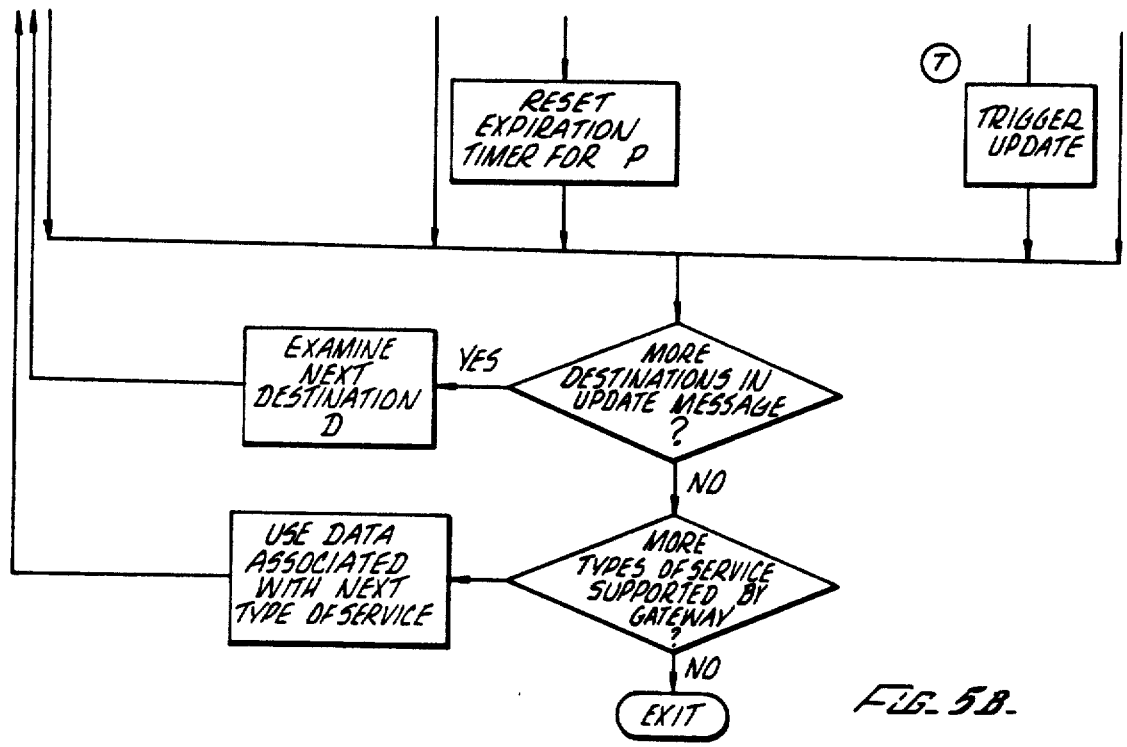
Figure 5:

In addition, the Appendix shows details of metric computations referred to in FIGS. 5 and 7.

These figures presuppose the following major data structures being stored in RAM 126. A separate set of these data structures is kept for each protocol supported by the gateway. Within each protocol a separate set of data structures is kept for each type of service to be supported. For each destination known to the system, there is a (possibly null) list of paths to the destination, and a timer. The timer is used to suppress certain classes of updates to the information pertaining to that destination, as described in more detail in FIGS. 5 and 6.

For each path to a destination, the data structure includes the address of the next hop in the path, a vector of metrics characterizing the path, including topological data, bandwidth, reliability and channel occupancy. Other information is also associated with each path, including hop count, the remote composite metric, and a composite metric calculated from numbers according to Eq. 1. There is also a flag indicating whether the path has been deactivated, and two timers: a path expiration timer and a deactivation timer. The path expiration timer is reset to a value of 270 seconds whenever the metric information for the path is updated (FIG. 5). If the timer expires (because 270 seconds have elapsed without such an update), the path is removed (FIG. 6). The deactivation timer is set to a value of 270 seconds whenever the flag is set to indicate that the path has been deactivated. At the end of 270 seconds the path is removed (FIG. 6).

Other data may be stored in the RAM as necessary to implement the processes described in FIGS. 4-8. The following sections are intended to clarify certain portions of FIGS. 4-8.

FIG. 4: This process uses the list of supported protocols and the information about the interfaces entered when the gateway is initialized. Details of the packet processing depend upon the protocol used by the packet. This is determined in Step A. Step A is the only portion of FIG. 4 which is shared by all protocols. Once the protocol type is known, the implementation of FIG. 4 appropriate to the protocol type is used.

Details of the packet contents are described by the specifications of the protocol. These should be known to anyone familiar with the art. The specifications of a protocol must include a procedure for determining the destination of a packet, a procedure for comparing the destination with the gateway's own address to determine whether the gateway itself is the destination, a procedure for determining whether a packet is a broadcast, and a procedure for determining whether the destination is a section of a specified network. These procedures are used in Steps B and C of FIG. 4. If the packet is determined to be addressed to the gateway, it is processed in a protocol-specific way. If it is a routing update, the subroutine of FIG. 5 is called. Otherwise, it is processed in a manner not related to this invention.

The test in Step D requires a search of the destinations listed in the RAM. The test is satisfied if there is an entry in the RAM for the destination, and that destination has associated with it at least one usable path. Note that the destination and path data used in this and the next step are maintained separately for each type of service supported. Thus, this step begins by determining the type of service specified by the packet, and selecting the corresponding set of data structures to use for this and the next step.

A path is usable for the purposes of Steps D and E if it has not been deactivated, and if its remote composite metric is less than its composite metric. (A path whose remote composite metric is greater than its composite metric path has a next hop that is "farther away" from the destination, as measured by the metric. This is referred to as an "upstream path.") Step E computes the path. Paths that have been deactivated are not considered. Paths whose remote composite metric is not less than their composite metrics are not considered. If more than one path is acceptable, such paths are used in a weighted form of round-robin alternation. The frequency with which a path is used is inversely proportional to its composite metric.

FIG. 5 describes the processing of a routing update received from a neighboring gateway. Such updates consist of a list of entries, each of which specifies information for a single destination. More than one entry for the same destination can occur in a single routing update, to accommodate multiple types of service. Each of these entries is processed individually, as described in FIG. 5.

The entire process described in FIG. 5 must be repeated once for each type of service supported by the gateway, using the set of destination/path information associated with that type of service. This is shown in the outer-most loop in FIG. 5.

In Steps B and C the RAM is searched to see whether this entry describes a path that is already known. A path in the RAM is defined by the destination with which it is associated, and the next hop listed as part of the path. The entry from the update packet describes a path whose destination is listed in the entry and whose next hop is the gateway that sent the update (the "source" S).

Step D is performed for the paths that are not already listed in the RAM. It tests whether the new path is acceptable. In order to be acceptable, the delay number must not be the special value that indicates an unreachable destination, and the composite metric (calculated as specified in the Appendix) must be acceptable. To determine whether the composite metric is acceptable, it is compared with the composite metrics of all other paths to the destination. Let M be the minimum of these. The new path is acceptable if it is $>V \times M$, where V is the variance set when the gateway was initialized. Note that if there were no other exiting paths to the specified destination, this test is satisfied trivially.

In Steps H and T, the update process described in FIG. 7 is scheduled. This process will actually run after the entire process described in FIG. 5 has been finished. That is, the update process described in FIG. 7 will only happen once, even if it is triggered several times during the processing described in FIG. 5.

Steps J and K are done if the path described by the current entry in the update packet already exists in the RAM. J tests the deactivation flag in the RAM entry. K compares the new composite metric, computed from data in the update packet, with the one in the RAM entry. The test in Step L is identical to that in Step D.

The test in Step M requires a comparison of all paths in the RAM associated with the destination, D. The minimum of the composite metrics is calculated. This calculation is done twice, first with the RAM entries unchanged, and second as if the RAM entry for the path P were replaced by the new data calculated from the update. If the second value is more than 1.3 times the first, this test succeeds.

Test O compares the hop count calculated from the data in the update with the hop count recorded in RAM as part of the path P. If the newly calculated one is greater than the one in RAM by more than 2, this test succeeds.

Step V is done when the new information for a path indicates that the composite metric will be decreased. The composite metrics of all paths to destination D are compared. In this comparison, the new composite metric for P is used, rather than the one appearing in RAM. The minimum composite metric M is calculated. Then all paths to D are examined again. If the composite metric for any path $>M \times V$, that path is removed. V is the variance, entered when the gateway was initialized.

The process described in FIG. 6 is triggered once a second. It examines various timers in the RAM, to see if any have expired. These timers are described elsewhere. Typically, the "timer" is a number in a RAM address which is periodically decremented.

In Step N, the RAM is checked to see whether there are any paths associated with the destination D. Paths with their deactivation flag set are not counted.

In Step U, the process described in FIG. 7 is activated.

Steps R and S are necessary because the composite metrics stored in RAM depend upon the channel occupancy, which changes over time, based on measurements. Every 90 seconds the channel occupancy is recalculated, using a moving average of measured traffic through the interface. If the newly-calculated value differs from the existing one, all composite metrics involving that interface must be adjusted. Every path shown in the RAM is examined. Any path whose next hop is interface "I" has its composite metric recalculated. This is done in accordance with Eq. 1, using as the channel occupancy the maximum of the value stored in RAM as part of the path's metric, and the newly calculated channel occupancy of the interface.

FIG. 7 describes how the gateway generates update messages to be sent to other gateways. A separate message is generated for each network interface attached to the gateway. That message is then sent to all other gateways that are reachable through the interface (Step J). This is usually done by sending the message as a broadcast. However, if the network technology or protocol does not allow broadcasts, it may be necessary to send the message individually to each gateway.

In general, the message is built up by adding an entry for each destination in the RAM in Step G. Note that the destination/path data associated with each type of service must be used. In the worst case, a new entry is added to the update for each destination for each type of service. However, before adding an entry to the update message in Step G, the entries already added are scanned. If the new entry is already present in the update message, it is not added again.

The Appendix describes how the metric information for a new entry is computed from an entry in RAM. Note that the entry is based on one particular path to the destination. If there is more than one in the RAM, a path whose composite metric is minimum is chosen. If more than one path has the minimum composite metric, an arbitrary tie-breaking rule is used. (For most protocols, this will be based on the address of the next hop gateway.)

As will be understood by those familiar with the art, the present invention may be embodied in other specific forms without departing from the spirit or essential characteristics thereof. For example, additional terms may be added to the metric vector and be used in computing the composite metric. Alternatively, different values might be chosen for timer settings and for other numerical parameters used in the disclosure above. A system in which the larger metric value is better might be used. Accordingly, the disclosure of the preferred embodiments of the invention is intended to be illustrative, but not limiting, of the scope of the invention which is set forth in the following claims. While the particular embodiment described here is based on the Ford algorithm for determining routes, the basic features of the invention, as set forth in the following claims, may also be used with other methods of propagating route information and other methods of finding the route with minimum metric.

APPENDIX

Details Of Metric Computations

1. Compute metrics for arriving routing update:

The input to this function is the entry for a specific destination in a routing update packet. The output is a vector of metrics which can be used to compute the composite metric, and a hop count. If this path is added to the data base in RAM, the entire vector of metrics is entered in RAM. The interface parameters used in the following definitions are those set when the gateway was initialized, for the interface on which the routing update arrived, except that the channel occupancy is based of measured traffic through the interface.

delay = delay from packet & interface topological delay;

bandwidth = min (bandwidth from packet, interface bandwidth);

reliability = min (reliability from packet, interface reliability); and

Channel occupancy = channel occupancy from packet.

The following are not part of the metric vector, but are also kept in RAM as characteristics of the path:

hop count = hop count from packet + 1;

Remote composite metric—calculated from Eq. 1 using the metric values from the packet; and Composite metric—calculated from Eq. 1 using the metric values calculated as described in this section, except that the channel occupancy used in this calculation is the larger of the channel occupancy shown above (from the packet) and the current measured channel occupancy of the interface.

2. Compute metrics for routing update to be sent—this function determines the metric information and hop count to be put into an outgoing update packet. It is based on a specific path to a destination.

If there are no paths, or the paths are all deactivated, the destination is called "inaccessible."

If destination is accessible, this is indicated by using a specific value in the delay field. This value is chosen to be larger than the largest valid delay.

If destination is directly reachable through one of the interfaces, use the delay, bandwidth, reliability, and channel occupancy of the interface set hop count to 0.

Otherwise, use the vector of metrics and the hop count associated with the path in RAM, except that channel occupancy should be the larger of the value in RAM and the current measured channel occupancy of the interface.

What is claimed is:

1. A method performed by a processor for dynamically routing a data transmission in a network from a source computer to a destination computer with a gateway, comprising the steps of:

identifying routing paths from said gateway to said destination computer;

characterizing each of said paths by a vector of metric values, each of said metric values corresponding to a characteristic of a path;

transmitting said vector of metric values to a node in said network;

computing a single composite metric from a first predetermined algorithm based on said vector of metric values;

determining a best path from a second predetermined algorithm based on said composite metric; and directing said data transmission over said best path.

2. The method of claim 1 wherein said metric values include:

a) a topological delay time for a transmission over a path;

b) a path bandwidth equal to the narrowest bandwidth of one or more segments making up said path;

c) a reliability number corresponding to the reliability of the path; and d) a channel occupancy obtained by measuring traffic along the path.

3. The method of claim 2 wherein said composite metric is determined by the algorithm $(K_1/B_e + K_2 D_c) * r$ where $K_1$ and $K_2$ are constants, $B_e$ is a path effective bandwidth equal to said path bandwidth multiplied by (1 − said channel occupancy), $D_c$ is said topological delay and r is said reliability.

4. The method of claim 2 wherein said second algorithm is further based on a hop count that is incremented at each gateway along a path.

5. The method of claim 1 further comprising the steps of transmitting data, including said composite metric, for each identified data path to at least two gateways coupled to said gateway as an update message and storing data from update messages received.

6. The method of claim 3 further comprising the steps of:

a) examining a protocol header of a data transmission to determine what characteristics of said data transmission are described;

b) varying the values of said constants $K_1$ and $K_2$ in accordance with said described data transmission characteristics; and c) maintaining separate sets of path information within said gateway for each combination of said described transmission characteristics.

7. The method of claim 6 further comprising the steps of merging said separate sets of path information into a single routing update transmission and eliminating duplicate information.

8. The method of claim 1 further comprising the step of modifying said first algorithm according to described data transmission characteristics associated with a data transmission.

9. The method of claim 1 further comprising the step of routing portions of said data transmission over multiple paths in alternation.

10. The method of claim 9 further comprising the step of computing the share of data to send over each of said multiple paths as inversely proportional to the composite metric of said path.

11. The method of claim 9 further comprising the step of maintaining a list of paths for each destination, with paths being maintained on the list when their composite metric is less than $M \times V$, where M is the minimum composite metric for the destination, and V is a predetermined variance.

12. The method of claim 9 further comprising the step of not sending data transmissions on a path where the composite metric for the destination is larger at a next gateway on said path than at a current gateway.

13. The method of claim 5 further comprising the step of deactivating a path when an update message indicates an increase in the metric of a predetermined kind.

14. The method of claim 5 further comprising the step of deactivating a path when an update message indicates an increase in hop count by more than 2.

15. The method of claim 5 further comprising the step of ceasing to accept update information about a destination for a predetermined time when the best composite metric for the destination has deteriorated by more than a predetermined amount.

16. The method of claim 5 further comprising the step of not sending information about a destination out the same interface from which said information was originally obtained.

17. A method performed by a computer for dynamically routing a data transmission from a source computer to a destination computer with a gateway, comprising the steps of:
- a) identifying routing paths from said gateway to said destination computer;
- b) characterizing each of said paths by at least one metric value corresponding to a characteristic of the path;
- c) transmitting said metric value for each identified path to at least one gateway coupled to said gateway as an update message;
- d) storing data from update messages received;
- d) deactivating a path when an update message indicates an increase of more than 2 in a hop count that is incremented at each gateway along a path;
- f) ceasing to accept update information about a destination for a predetermined period of time when the metric value for the best path to said destination has deteriorated by more than a predetermined amount;
- g) not sending information about a destination out the same interface from which said information was originally obtained;
- h) determining a best path from said metric values; and
- i) directing data transmissions over said best path.

18. A gateway for routing a data transmission in a network from a source computer to a destination computer, comprising:
- means for identifying routing paths from said gateway to said destination computer;
- means for characterizing each of said paths by a vector of metric values, each of said metric values corresponding to a characteristic of a path;
- means for transmitting said vector of metric values to a node in said network;
- means for computing a single composite metric from a first predetermined algorithm based on said vector of metric values;
- means for determining a best path from a second predetermined algorithm based on said composite metric; and
- means for directing said data transmission over said best path.

19. The gateway of claim 18 wherein said metric values include:
- a) a topological delay time for a transmission over a path;
- b) a path bandwidth equal to the narrowest bandwidth of one or more segments making up said path;
- c) a reliability number corresponding to the reliability of the path; and
- d) a channel occupancy obtained by measuring traffic along the path.

20. The gateway of claim 19 wherein said composite metric is determined by the algorithm $(K_1/B_e + K_2D_c) * r$ where $K_1$ and $K_2$ are constants, $B_e$ is a path effective bandwidth equal to said path bandwidth multiplied by (1 − said channel occupancy), $D_c$ is said topological delay and r is said reliability.

21. The gateway of claim 19 wherein said second algorithm is further based on a hop count that is incremented at each gateway along a path.

22. The gateway of claim 18 further comprising means for transmitting the stored data, including said composite metric, for each identified data path to at least one gateway coupled to said gateway as an update message and means for storing data from update messages received.

23. The gateway of claim 20 further comprising:
- a) means for examining a protocol header of a data transmission to determine what characteristics of said data transmission are described;
- b) means for varying the values of said constants $K_1$ and $K_2$ in accordance with said described data transmission characteristics; and
- c) means for maintaining separate sets of path information within said gateway for each combination of said described transmission characteristics.

24. The gateway of claim 18 further comprising means for modifying said first algorithm according to described data transmission characteristics associated with a data transmission.

25. The gateway of claim 23 further comprising means for merging said separate sets of path information into a single routing update transmission and means for eliminating duplicate information.

26. The gateway of claim 18 further comprising means for routing portions of said data transmission over multiple paths in alternation.

27. The gateway of claim 26 further comprising means for computing the share of data to send over each of said multiple paths as inversely proportional to the composite metric of said path.

28. The gateway of claim 26 further comprising means for maintaining a list of paths for each destination, with paths being maintained on the list when their composite metric is less than $M \times V$, where M is the minimum composite metric for the destination, and V is a predetermined variance.

29. The gateway of claim 26 further comprising means for not sending data transmissions on a path where the composite metric for the destination is larger at a next gateway on said path than at a current gateway.

30. The gateway of claim 22 further comprising means for deactivating a path when an update message indicates an increase in the metric of a predetermined kind.

31. The gateway of claim 22 further comprising means for deactivating a path when an update message indicates an increase in hop count by more than 2.

32. The gateway of claim 22 further comprising means for ceasing to accept update information about a destination for a predetermined time when the best composite metric for the destination has deteriorated by more than a predetermined amount.

33. The gateway of claim 22 further comprising means for not sending information about a destination out the same interface from which said information was originally obtained.

34. A gateway for routing a data transmission from a source computer to a destination computer, comprising:
- a) means for identifying routing paths from said gateway to said destination computer;
- b) means for characterizing each of said paths by at least one metric value corresponding to a characteristic of the path;
- c) means for transmitting said metric value for each identified path to at least one gateway coupled to said gateway as an update message;
- d) means for storing data from update messages received;
- d) means for deactivating a path when an update message indicates an increase of more than 2 in a hop count that is incremented at each gateway along a path;

f) means for ceasing to accept update information about a destination for a predetermined period of time when the metric value for the best path to said destination has deteriorated by more than a predetermined amount;

g) means for not sending information about a destination out the same interface from which said information was originally obtained;

h) means for determining a best path from said metric values; and i) means for directing data transmission over said best path.

35. A method performed by a processor of dynamically routing data from a source to a destination in a network having an intermediate node, said method comprising identifying at least one routing path from said node to said destination;

associating each said path with a plurality of routing data items, each of said routing data items being representative of a routing characteristic of said path;

transmitting said plurality of routing data items to a node in said network; and selecting at least one preferred path based on said plurality of routing data items.

36. A method as in claim 35, wherein said plurality of routing data items comprises at least one of the group: delay time, bandwidth, reliability, channel occupancy, and security.

37. A method as in claim 35, wherein said step of selecting comprises computing a composite routing characteristic from said plurality of routing data items; and selecting at least one preferred path based on said composite routing characteristic.

38. A method as in claim 35, wherein said step of associating comprises identifying at least one subpath of each said path;

associating each said subpath with a plurality of subpath routing data items, each of said subpath routing data items being representative of a routing characteristic of said subpath; and computing said plurality of routing data items based on said plurality of subpath routing data items for each said subpath.

39. A method as in claim 38, wherein each said subpath comprises a hop.

40. A method as in claim 38, wherein said step of computing comprises computing a composite routing data item for each said subpath routing data item.

41. A method as in claim 38, wherein said step of computing comprises for each said subpath routing data item, applying a function to said plurality of subpath routing data items for each said subpath.

42. A method as in claim 41, wherein said function comprises one of the group: addition, minimum, and product, of a plurality of subpath routing data items.

43. A method as in claim 41, wherein said function comprises addition when said subpath routing data item is delay time, minimum when said subpath routing data item is bandwidth, and product when said subpath routing data item is reliability.

44. An intermediate node in a network for routing data from a source to a destination, comprising means for identifying at least one routing path from said node to said destination;

means for associating each said path with a plurality of routing data items, each of said routing data items being representative of a routing characteristic of said path;

means for transmitting said plurality of routing data items to a node in said network; and means for selecting at least one preferred path based on said plurality of routing data items.

45. A network for routing data from a source to a destination, said network comprising at least one intermediate node having means for identifying at least one routing path from said node to said destination;

means for associating each said path with a plurality of routing data items, each of said routing data items being representative of a routing characteristic of said path;

means for transmitting said plurality of routing data items to a node in said network; and means for selecting at least one preferred path based on said plurality of routing data items.

46. A method performed by a processor of dynamically routing a message from a source to a destination in a network having an intermediate node, said method comprising determining a transmission type of said message;

identifying at least one routing path from said node to said destination;

associating each said path with a routing data item which is representative of at least one routing characteristic of said path, wherein the choice of said routing data item is based on said transmission type; and selecting at least one preferred path based on said plurality of routing data items.

47. A method as in claim 46, wherein said step of determining comprises examining at least a part of said message.

48. A method as in claim 46, wherein said step of associating comprises computing a composite routing data item based on said at least one routing characteristic and based on said transmission type.

49. A method as in claim 46, wherein said step of associating comprises associating a variable value with each routing characteristic of said path;

associating at least one coefficient value with said transmission type;

computing a composite routing characteristic based on a polynomial having said at least one coefficient value and at least one said variable value as material factors.

50. An intermediate node in a network for routing a message from a source to a destination, comprising means for determining a transmission type of said message;

means for identifying at least one routing path from said node to said destination;

means for associating each said path with a routing data item which is representative of at least one routing characteristic of said path, wherein the choice of said routing data item is based on said transmission type; and means for selecting at least one preferred path based on said plurality of routing data items.

51. A network for routing a message from a source to a destination, said network comprising at least one intermediate node having
   means for determining a transmission type of said message;
   means for identifying at least one routing path from said node to said destination;
   means for associating each said path with a routing data item which is representative of at least one routing characteristic of said path, wherein the choice of said routing data item is based on said transmission type; and
   means for selecting at least one preferred path based on said plurality of routing data items.

52. A method performed by a processor of dynamically routing a message from a source to a destination in a network having an intermediate node, said method comprising
   determining a transmission type of said message;
   identifying at least one routing path from said node to said destination;
   associating each said path with a plurality of routing data items, each of said routing data items being representative of a routing characteristic of said path, wherein the choice of at least one of said plurality of routing data items is based on said transmission type; and
   selecting at least one preferred path based on said plurality of routing data items.

53. A method performed by a processor of routing data from a source to a destination in a network having an intermediate node and a plurality of routing paths from said node to said destination, said method comprising;
   characterizing each routing path with at least one routing characteristic;
   selecting as a first routing path, the routing path characterized with a most preferred routing characteristic in accordance with a predetermined condition;
   selecting as a set of second routing paths, the routing paths each characterized with a routing characteristic within a predetermined tolerance of the routing characteristic the first routing path;
   identifying said first routing path and said set of second routing paths as a plurality of preferred routing paths; and
   routing at least part of said data along each of said plurality of preferred routing paths.

54. A method performed by a processor of routing data from a source to a destination in a network having an intermediate node and a plurality of routing paths from said node to said destination, said method comprising:
   characterizing each routing path with at least one routing characteristic;
   selecting as a first routing path, the routing path characterized with a minimum routing characteristic M;
   selecting as a set of second routing paths, the routing paths each characterized with routing characteristics less than M × V, wherein V is a predetermined tolerance factor;
   identifying said first routing path and said set of second routing paths as in plurality of preferred routing paths; and
   routing at least part of said data along each of said plurality of preferred routing paths.

55. A method performed by a processor of dynamically routing a message from a source to a destination in a network having an intermediate node, said method comprising
   determining a transmission type of said message and a plurality of message data items of said message;
   identifying at least one routing path from said node to said destination;
   associating each said path with a routing data item which is representative of at least one routing characteristic of said path, wherein the choice of said routing data item is based on said transmission type;
   identifying a plurality of preferred routing paths from said node to said destination based on said routing data item; and
   routing at least some of said message data items along each of said plurality of preferred routing paths.

56. A method performed by a processor of dynamically routing a data message from a source to a destination in a network having an intermediate node, said method comprising
   receiving an incoming update message from at least one transmitting node coupled to said node, said incoming update message comprising at least one network data item;
   identifying at least one routing path from said node to said destination;
   associating each said path with a routing data item based on said network data item;
   deactivating a said path from selection whenever a predetermined routing data item differs from a previous value of said routing data item by more than a predetermined tolerance; and
   selecting at least one preferred path based on said routing data item.

57. A method as in claim 56, wherein said routing data item is a composite of at least two network data items.

58. A method as in claim 56, wherein said routing data item is a hop count and said tolerance is 2.

59. A method as in claim 56, comprising ceasing to accept update information about a destination for a predetermined time when the best composite metric for the destination has deteriorated by more than a predetermined amount.

60. A method as in claim 56, comprising transmitting an outgoing update message to at least one receiving node coupled to said node, wherein said receiving node is coupled to said node by means of an interface other than an interface from which said information was originally obtained.

61. An intermediate node in a network for routing a data message from a source to a destination, comprising
   means for receiving an incoming update message from at least one transmitting node coupled to said node, said incoming update message comprising at least one network data item;
   means for identifying at least one routing path from said node to said destination;
   means for associating each said path with a routing data item based on said network data item;
   means for deactivating a said path from selection whenever a predetermined routing data item differs from a previous value of said routing data item by more than a predetermined tolerance; and
   means for selecting at least one preferred path based on said routing data item.

62. A network for routing a data message from a source to a destination, said network comprising at least one intermediate node having
- means for receiving an incoming update message from at least one transmitting node coupled to said node, said incoming update message comprising at least one network data item;
- means for identifying at least one routing path from said node to said destination;
- means for associating each said path with a routing data item based on said network data item;
- means for deactivating a said path from selection whenever a predetermined routing data item differs from a previous value of said routing data item by more than a predetermined tolerance; and
- means for selecting at least one preferred path based on said routing data item.

63. A method performed by a processor of dynamically routing data from a source to a destination in a network having an intermediate node, said method comprising
- receiving an incoming update message from at least one transmitting node coupled to said node, said incoming update message comprising at least one network data item;
- associating each said path with a routing data item based on said network data item;
- identifying a plurality of preferred routing paths from said node to said destination based on said routing data item;
- deactivating a said path from selection whenever a predetermined routing data item differs from a previous value of said routing data item by more than a predetermined tolerance; and
- routing at least part of said data along each of said plurality of preferred routing paths.

64. A method performed by a processor of dynamically routing a data message from a source to a destination in a network having an intermediate node, said method comprising
- receiving an incoming update message from at least one transmitting node coupled to said node, said incoming update message comprising at least one network data item;
- determining a transmission type of said data message and a plurality of message data items of said data message;
- identifying at least one routing path from said node to said destination;
- associating each said path with a plurality of routing data items, each of said routing data items being representative of a routing characteristic of said path, wherein the choice of at least one of said plurality of routing data items is based on said transmission type, and wherein at least one said routing data item is based on said network data item;
- deactivating a said path from selection whenever a predetermined routing data item differs from a previous value of said routing data item by more than a predetermined tolerance;
- identifying a plurality of preferred routing paths from said node to said destination based on said plurality of routing data items; and
- routing at least some of said message data items along each of said plurality of preferred routing paths.

* * * * *